United States Patent [19]

Mori

[11] Patent Number: 4,656,500

[45] Date of Patent: Apr. 7, 1987

[54] ADAPTIVE TYPE COMPRESSION METHOD FOR COMPRESSING A COLOR IMAGE BY IMPARTING PREDETERMINED VARIABLE-LENGTH CODES TO COMBINATIONS OF QUANTIZED VALUES BASED UPON QUANTIZED PREDICTION ERROR COMPONENTS

[75] Inventor: Sumio Mori, Kaisei, Japan

[73] Assignee: Fuji Photo Film Co., Ltd., Minamiashigara, Japan

[21] Appl. No.: 604,480

[22] Filed: Apr. 27, 1984

[30] Foreign Application Priority Data

Apr. 27, 1983 [JP] Japan .................................. 58-74666

[51] Int. Cl.$^4$ ..................... H04N 11/04; H04N 1/417; H04N 7/137
[52] U.S. Cl. ..................................... 358/13; 358/135; 358/260
[58] Field of Search ................. 358/133, 260, 13, 135, 358/138

[56] References Cited

U.S. PATENT DOCUMENTS

| | | | |
|---|---|---|---|
| 3,984,626 | 10/1976 | Mounts et al. | 358/133 |
| 4,093,962 | 6/1978 | Ishiguro et al. | 358/138 |
| 4,131,915 | 12/1978 | Nakagome et al. | 358/260 |
| 4,302,775 | 11/1981 | Widergren et al. | 358/13 |
| 4,386,366 | 5/1983 | Mori | 358/260 |
| 4,454,546 | 6/1984 | Mori | 358/260 |
| 4,467,346 | 8/1984 | Mori | 358/13 |
| 4,517,596 | 5/1984 | Suzuki | 358/138 |
| 4,569,058 | 2/1986 | Grallert | 358/133 |
| 4,580,162 | 4/1986 | Mori | 358/133 |

FOREIGN PATENT DOCUMENTS 48779 5/1981 Japan .................................. 358/260

Primary Examiner—James J. Groody
Assistant Examiner—Randall S. Svihla
Attorney, Agent, or Firm—Fleit, Jacobson, Cohn & Price

[57] ABSTRACT

An adaptive type compression method for a color image in which each sequence of picture elements obtained by combination of sum-difference transformation with DPCM is compressed by being multiplied by an adaptive zonal filter. The sum-difference transformation is used to simplify transformation of the image into a spatial frequency zone. The zone filter characteristic is adaptively selected according to a predetermined transmission bit rate (compression rate). Further, this zonal filter characteristic is set so as to correspond with luminance and color difference signals. According to this method, image information to be recorded can be arbitrarily selected and distortion of the image at compressing and reproducing can be eliminated.

4 Claims, 18 Drawing Figures

| Z.F. No. | ZONAL FILTER ΔS0 ΔS1 ΔC0 ΔC1 | QUANTIZED VALUE ΔS0 ΔS1 ΔC0 ΔC1 | CODE LENGTH n1, n2 | B | C | CODE |
|---|---|---|---|---|---|---|
| 1 | 0 1 1 2 | 0 0 0 0 | 2 | 0 | 0 | |
| | | ±1 0 0 0 | 3 | 0 | 1 | $S_x$ |
| | | h h 0 0 | 8 | 1 | 0 | $S_x X_4 X_3 X_2 X_1 X_0$ |
| | | h h h h | 20 | 1 | 1 | $S_x X_4 X_3 S_Y S_A S_B X_2 Y_3 A_2 B_2 X_1 Y_2 A_1 B_1 X_0 Y_1 A_0 B_0$ |
| 2 | 1 2 1 1 | 0 0 0 0 | 2 | 0 | 0 | |
| | | ±1 0 0 0 | 3 | 0 | 1 | $S_x$ |
| | | h 0 0 0 | 7 | 1 | 0 | $S_x X_4 X_3 X_2 X_1$ |
| | | h h h h | 16 | 1 | 1 | $S_x X_4 X_3 S_Y S_A S_B X_2 Y_3 A_2 B_2 X_1 Y_2 A_1 B_1$ |
| 3 | 2 3 2 2 | 0 0 0 0 | 2 | 0 | 0 | |
| | | ±1 0 0 0 | 3 | 0 | 1 | $S_x$ |
| | | h 0 0 0 | 6 | 1 | 0 | $S_x X_4 X_3 X_2$ |
| | | h h h h | 12 | 1 | 1 | $S_x X_4 X_3 S_Y S_A S_B X_2 Y_3 A_2 B_2$ |
| 4 | 3 4 3 3 | 0 0 0 0 | 2 | 0 | 0 | |
| | | ±1 0 0 0 | 3 | 0 | 1 | $S_x$ |
| | | h 0 0 0 | 5 | 1 | 0 | $S_x X_4 X_3$ |
| | | h h h h | 8 | 1 | 1 | $S_x X_4 X_3 S_Y S_A S_B$ |

| obr | | OUTPUT BIT RATE |
|---|---|---|
| 0 | 0 | 3.0 BIT/PICTURE ELEMENT |
| 0 | 1 | 3.5 |
| 1 | 0 | 4.0 |
| 1 | 1 | 4.5 |

FIG. IIA

FIG. IIB

ADAPTIVE TYPE COMPRESSION METHOD FOR COMPRESSING A COLOR IMAGE BY IMPARTING PREDETERMINED VARIABLE-LENGTH CODES TO COMBINATIONS OF QUANTIZED VALUES BASED UPON QUANTIZED PREDICTION ERROR COMPONENTS

BACKGROUND OF THE INVENTION

1. Field of the Invention

This invention relates to an image compression system wherein image signals are encoded adaptively into variable-length codes according to combinations of sum components of two adjacent picture elements with difference components thereof.

2. Description of the Prior Art

It is well known that the information transmission capacity requirement can be reduced or band compression can be achieved by eliminating signals which are redundant from the viewpoint of statistical properties of images or which are unnecessary from the viewpoint of visual characteristics.

When biases are imparted to an image by conducting an image transformation by utilizing strong spatial correlation between adjacent picture elements of the image, it becomes possible to conduct encoding of image signals at a high efficiency. As to transformation systems for imparting biases to an image, there have heretofore been known a linear prediction transformation system and an orthogonal transformation system. The linear prediction transformation system utilizes statistical biases exhibited by prediction error components when adjacent picture elements are predicted. The orthogonal transformation system utilizes a bias arising in a spectrum of each frequency component which is outputted when an image is transformed into a spatial frequency zone. In general, in order to achieve high-efficiency encoding, the amount of information is reduced by imparting a distortion, i.e. a quantization distortion, within a visually permissible range to the transformation components. Further, in the case where biases exist in the probability distributions of the transformation components, the entropy becomes small, and it is advantageous to input variable-length codes suitable for the small entropy.

On the other hand, the aforesaid statistical biases are markedly different depending on the type of the image. Thus the biases are large in the case of a smooth image and, conversely, large fluctuation arises in the case of a complicated image. As a result, in the variable-length encoding, the compressibility is markedly different according to the type of the image. That is, the amount of image information compressed is markedly different depending on the type of the image. This means that, when the speeds of input and output of image signals are constant in a system, variable-length encoding conducted in this system causes a difference in the time base to arise with respect to the amount of information transmitted. Accordingly, it becomes necessary to correct the fluctuation of the time base.

SUMMARY OF THE INVENTION

The primary object of the present invention is to provide an adaptive type image compression system for a color image, which conducts encoding of image signals into variable-length codes at a high efficiency.

Another object of the present invention is to provide an adaptive type image compression system for a color image, which conducts encoding adaptively so as to restrict fluctuation of compressibility according to the output bit rate.

The adaptive type compression system for a color image in accordance with the present invention comprises the steps of:

(i) blocking picture element groups obtained by color separation of a color image signal into a plurality of color components, said blocking being conducted for the respective color components so that each block comprises two adjacent picture elements, (ii) obtaining sum components and difference components from two picture elements of each block, (iii) transforming said sum components and said difference components into prediction error components, (iv) quantizing said prediction error components by selecting a quantization characteristic from a plurality of predetermined quantization characteristics, (v) obtaining a plurality of combinations of quantized values from the quantized values of said prediction error components in each block obtained for each of said color components, and (vi) imparting a predetermined variable-length code to each combination of quantized values.

In the present invention, since the variable-length encoding is conducted according to combinations of components obtained by the sum-difference transformation and the prediction transformation of the original picture element groups, it is possible to achieve encoding at a high efficiency without increasing the amounts of distortion imparted to the components. Accordingly, the image compression system of the present invention causes little deterioration in the image quality of an image reproduced from the original image in spite of the high compressibility. Further, in the present invention, the system is controlled so that fluctuation of the compressibility generated by the variable-length encoding, i.e. a difference in time base between an encoding bit rate and a transmission bit rate, can be accommodated by a small-capacity buffer memory. This control also contributes to the realization of the high-efficiency compression system adapted to visual characteristics.

Further, in the present invention, even when the transmission bit rate or the amount of information transmitted through a transmission line has to be changed according to purposes, it is possible to select an arbitrary image compressibility by designating only the bit rate of the output from the aforesaid buffer memory.

Basically, in the present invention, Hadamard transformation is employed as a means for transforming the image signal into a spatial frequency zone, and the spatial frequency components thus obtained are further subjected to linear prediction transformation.

The Hadamard transformation can be achieved by use of just adders and subtracters since the transformation matrix is composed of elements $+1$ and $-1$. A sequence obtained by the Hadamard transformation of an image signal into the frequency zone corresponds to the frequency base in Fourier transformation. Thus a sequence of zero order can be regarded as a parameter denoting the amount of a direct current component, and a sequence of higher order can be regarded as a parameter designating the amount of a high frequency component. When correlation between the original picture elements is strong, the signal energy after the Hadamard transformation is centered at the sequence of lower order, and the signal energy at the sequence of higher order becomes little. Therefore, it is possible to reduce the mean information amount by carrying out bit assignment on a quantization level suitable for each sequence. Further, the Hadamard transformation encoding system for the purpose of band compression is advantageous particularly for encoding at a low bit rate and can disperse the deterioration in image quality caused by quantization of each sequence so that the deterioration in image quality is visually imperceptible. That is, in the Hadamard transformation encoding system, quantization can be conducted in a manner suitable for the spatial frequency by utilizing the visual characteristics that quantization noise at a smooth portion of an image is visually perceptible, but quantization noise at an image portion involving a sharp change is visually imperceptible.

As described above, by allocating an adequate quantization level according to the amount of the spectrum of each sequence obtained by the Hadamard transformation, i.e. by imparting a distortion within a visually permissible range to each spectrum, it becomes possible to decrease the whole information amount. As the amount of the spectrum of each sequence becomes small, the number of bits of the quantization level to be allocated becomes small.

In the case of an ordinary image, since the correlation between adjacent picture elements is strong, energy of a sequence component of lower order is observed to be high, and energy of a sequence component of higher order is observed to be low. Therefore, when transformation is carried out so as to decrease the energy of the component of lower order, particularly the direct current component, it is possible to further reduce the number of bits to be allocated. As a method of such transformation, there has heretofore been known a system for linear prediction transformation of each sequence obtained by the Hadamard transformation.

Figure 1:
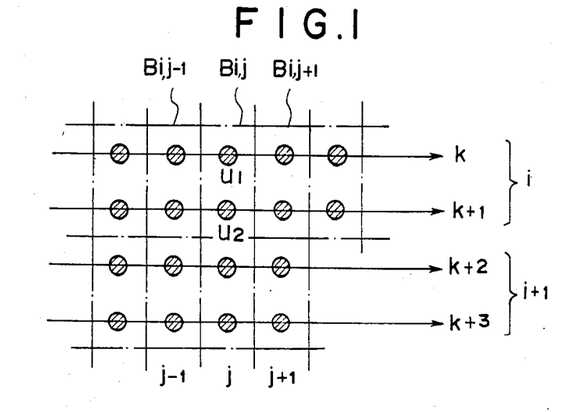
FIG. 1 is a schematic view showing an example of blocking of an original image in the unit of two adjacent picture elements.

The aforesaid linear prediction transformation will hereinbelow be described with reference to FIGS. 1 and 2A to 2D. FIG. 1 is a schematic view showing an example of blocking of an original image in the unit of two adjacent picture elements. For simplicity of explanation, the block size of the Hadamard transformation is taken as $2 \times 2$, and the original image is assumed to have a picture element composition as shown in FIG. 1. In FIG. 1, k, k+1, ... designate the scanning line numbers on the original image, and sets of two adjacent scanning lines are called block lines i, i+1, ... Picture elements are numbered j, j+1, ... in the horizontal direction, and the original image is blocked in the unit of two vertically adjacent picture elements into blocks $B_{i,j}$, $B_{i,j+1}$, ... In this case, the normalized Hadamard transformation of a block size of $2 \times 2$ for data on the picture elements $u_{j,1}$ and $u_{j,2}$ of the block $B_{i,j}$ and the picture elements $u_{j+1,1}$ and $u_{j+1,2}$ of the block $B_{i,j+1}$ can be expressed by use of quadratic or quartic Hadamard matrices as Equation (1):

$$\frac{1}{2}\begin{bmatrix} 1 & 1 \\ 1 & -1 \end{bmatrix} \cdot \begin{bmatrix} u_{j\cdot 1} & u_{j\cdot 2} \\ u_{j+1\cdot 1} & u_{j+1\cdot 2} \end{bmatrix} \cdot \begin{bmatrix} 1 & 1 \\ 1 & -1 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} u_{j\cdot 1} \\ u_{j\cdot 2} \\ u_{j+1\cdot 1} \\ u_{j+1\cdot 2} \end{bmatrix} = \begin{bmatrix} H0 \\ H1 \\ H2 \\ H3 \end{bmatrix} \quad (1)$$

In the Equation (1), the sequences H0, H1, H2 and H3 correspond to the frequency components obtained by the Hadamard transformation into the frequency zone. Thus H0 designates the direct current component, H1 denotes the vertical component, H2 denotes the horizontal component, and H3 designates the inclination component.

By way of example, sequences obtained by the Hadamard transformation of four picture elements $u_{j-2,1}$, $u_{j-2,2}$, $u_{j-1,1}$, and $u_{j-1,2}$ of the two previous blocks $B_{i,j-2}$ and $B_{i,j-1}$ are called H0', H1', H2', and H3'. The sequences obtained by the Hadamard transformation of four picture elements $u_{j,1}$, $u_{j,2}$, $u_{j+1,1}$, and $u_{j+1,2}$ of two present blocks $B_{i,j}$ and $B_{i,j+1}$ are H0, H1, H2, and H3. Thus the Hadamard transformation of a block size of $2 \times 2$ is carried out in the horizontal direction of FIG. 1, and each of the sequences obtained is subjected to linear prediction transformation in the horizontal direction. In this case, when the sequences H0 and H1 of the two present blocks $B_{i,j}$ and $B_{i,j+1}$ are subjected to linear prediction as expressed by Equation (2):

$$\left.\begin{aligned} \hat{H0} &= H0' - H2' - H2 \\ \hat{H1} &= H1' - H3' - H3 \\ \Delta H0 &= H0 - \hat{H0} = H0 - H0' + H2' + H2 \\ \Delta H1 &= H1 - \hat{H1} = H1 - H1' + H3' + H3 \end{aligned}\right\} \quad (2)$$

wherein $\hat{H0}$ and $\hat{H1}$ respectively designate the predicted values of the sequences H0 and H1, $\Delta H0$ and $\Delta H1$ respectively denote the direct current prediction error component and the vertical prediction error component, these prediction error components minimize the distances between picture elements of blocks. When the correlation between the picture elements is strong, it becomes possible to decrease the energy of the prediction error components. This is because, when the correlation between the picture elements is strong, the values of the prediction error components are concentrated in the direction towards zero.

When image signals are transformed as described above and the sequences $\Delta H0$, $\Delta H1$, H2 and H3 are transmitted, it is possible to markedly reduce the transmission energy as compared with the case where the sequences H0, H1, H2 and H3 are directly transmitted. Thus it was found that the aforesaid system is a very efficient encoding system.

From Equations (1) and (2), the sequences $\Delta H0$, $\Delta H1$, H2 and H3 can be expressed with respect to the picture elements as $$\left.\begin{aligned} \Delta H0 &= (u_{j\cdot 1} + u_{j\cdot 2}) - (u_{j-1\cdot 1} + u_{j-1\cdot 2}) \\ H2 &= -\{(u_{j+1\cdot 1} + u_{j+1\cdot 2}) - (u_{j\cdot 1} + u_{j\cdot 2})\}/2 \end{aligned}\right\} \quad (3)$$

$$\left.\begin{aligned} \Delta H1 &= (u_{j\cdot 1} - u_{j\cdot 2}) - (u_{j-1\cdot 1} - u_{j-1\cdot 2}) \\ H3 &= -\{(u_{j+1\cdot 1} - u_{j+1\cdot 2}) - (u_{j\cdot 1} - u_{j\cdot 2})\}/2 \end{aligned}\right\} \quad (4)$$

In the Equations (3) and (4), $\Delta H0$ and $\Delta H1$ are obtained by subtracting the sum of two previous picture elements $u_{j-1,1}$ and $u_{j-1,2}$ or the difference therebetween from the sum of two present picture elements $u_{j,1}$ and $u_{j,2}$ or the difference therebetween. This also applies to H2 and H3 of the Equations (3) and (4). Accordingly, the sequences obtained from the Equations (1) and (2) and the sequences obtained from the Equations (3) and (4) can respectively be generated by circuit configurations as shown in FIGS. 2A to 2D.

Figure 2A:
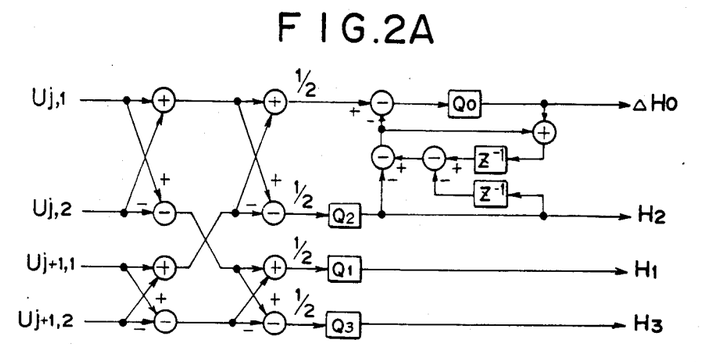
FIG. 2A is a diagram showing the circuit configuration of an image transformation means using the Hadamard transformation of a block size of $2 \times 2$ and the prediction transformation.
Figure 2B:
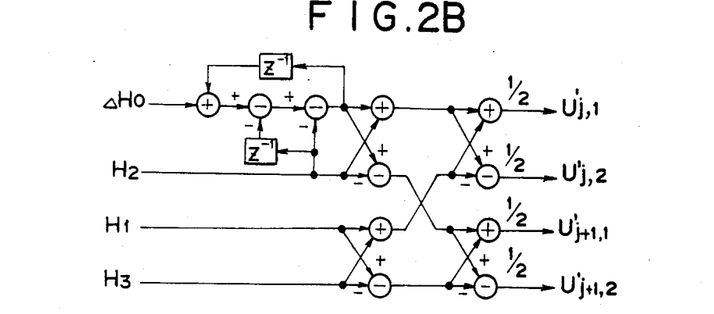
FIG. 2B is a diagram showing the circuit configuration of a means for inverse transformation of the sequences obtained by the image transformation means of FIG. 2A.
Figure 2C:
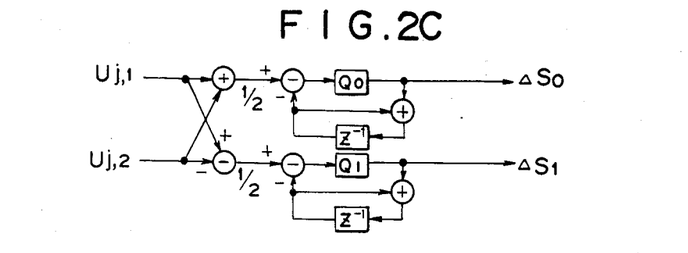
FIG. 2C is a diagram showing the circuit configuration of an image transformation means using the sum-difference transformation and the prediction transformation.
Figure 2D:
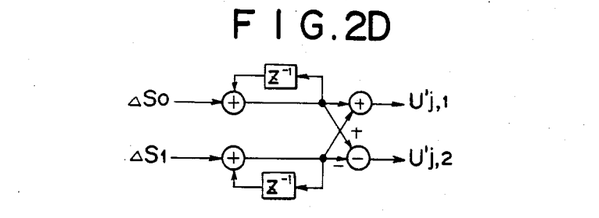
FIG. 2D is a diagram showing the circuit configuration of a means for inverse transformation of the sequences obtained by the image transformation means of FIG. 2C.

FIG. 2A shows a circuit configuration for obtaining the sequences on the basis of the Equations (1) and (2), and FIG. 2B shows a circuit configuration for inverse transformations of the sequences obtained in FIG. 2A. FIG. 2C shows a circuit configuration for obtaining the sequences on the basis of the Equations (3) and (4), and FIG. 2D shows a circuit configuration for inverse transformations of the sequences obtained in FIG. 2C. In FIGS. 2A to 2D, Qi designates the quantizer, and $Z^{-1}$ denotes the element for delay of one block. In FIGS. 2A and 2B, the elements for transformation of the vertical component H1 into the prediction error component are omitted for simplicity of explanation.

In FIG. 2C, sequences $\Delta H0/2$ and $-H2$ are alternately generated as an output signal $\Delta S0$, and sequences $\Delta H1/2$ and $-H3$ are alternately generated as an output signal $\Delta S1$. From FIGS. 2A to 2D, it is understood that use of the circuit configurations of FIGS. 2C and 2D is advantageous over the use of the circuit configurations of FIGS. 2A and 2B if a quantization distortion is visually admitted to some extent as described above.

The signals of the picture elements $u_{j,1}$ and $u_{j,2}$ may be luminance signals, color signals or color difference signals.

As described above, the present invention is characterized by the transformations of color image signals by use of the simple circuit configurations as shown in FIGS. 2C and 2D.

The respective sequences are obtained by transforming the image signals as described above. Heretofore, encoding was conducted by giving appropriate quantization levels to the sequences $\Delta H0$, $\Delta H1$, H2 and H3 or to the sequences $\Delta S0$ and $\Delta S1$, and carrying out bit allocation. The quantization corresponds to imparting distortions to respective frequency components within the range causing no visual deterioration in the spatial power spectrum of the image. Thus the amount of information to be transmitted is reduced by the quantization.

The aforesaid sequence $\Delta S0$ corresponds to the sequences $\Delta H0/2$ and $-H2$, and the sequence $\Delta S1$ corresponds to the sequences $\Delta H1/2$ and $-H3$. For example, when five bits are allocated to the sequence $\Delta S0$ and three bits are allocated to the sequence $\Delta S1$, the total amount of information to be transmitted is eight bits per block $B_{ij}$ (four bits/picture element on the average). This encoding method is not an efficient one from the viewpoint of compressibility. In order to compress the information to a higher extent, it is necessary to impart larger quantization distortions to the information. As a result, the quality of the image reproduced is deteriorated to a higher extent.

The present invention markedly improves the compressibility without imparting large quantization distortions to the information in the encoding method as described above. In the present invention, instead of transmitting the quantized values of the sequences $\Delta S0$ and $\Delta S1$ as in the conventional method, combinations of the quantized values of the sequences $\Delta S0$ and $\Delta S1$ are constituted, and variable-length codes are allocated to the combinations. For example, encoding is conducted in such a manner that (1) when the quantized values of the sequences are $\Delta S0 = \Delta S1 = 0$ (61%), only the code of this combination is transmitted, (2) when the quantized values of the sequences are $\Delta S0 = \pm 1$ and $\Delta S1 = 0$ (28%), only the code of this combination and the plus and minus signs of $\Delta S0$ are transmitted, (3) when the quantized values of the sequences are $\Delta S0 \neq 0$, $\pm 1$ and $\Delta S1 = 0$ (9%), only the code of this combination and the quantized value of $\Delta S0$ are transmitted, and (4) when the quantized values of the sequences are of the other combination (2%), the code of the combination and all quantized values of $\Delta S0$ and $\Delta S1$ are transmitted.

In the present invention, encoding is conducted as described above because of the probability of the quantized value of the sequence $\Delta S1$ becoming very much smaller than the quantized value of the sequence $\Delta S0$ and becoming zero, and therefore the appearance probabilities of the respective combinations as indicated in the parentheses in (1) to (4) are obtained when the sequences $\Delta S0$ and $\Delta S1$ are quantized to an extent causing no visual deterioration in a standard monochromatic image.

The method of imparting variable-length codes according to the combinations of the quantized values of the sequences $\Delta S0$ and $\Delta S1$ in one block $B_{ij}$ in accordance with the present invention is a very efficient one. However, in this case, since the compressibility becomes variable among the blocks, the problems as described above arise. Accordingly, it is necessary to use a buffer memory having a capacity sufficient to accommodate the difference between the encoding bit rate and the transmission bit rate, i.e. to compensate for fluctuation in the time base. In the case of an ordinary image, since the compressibility fluctuates by a factor within the range of two to four times according to the type of the image, it is generally necessary to use a buffer memory having a large capacity. However, the system of the present invention is constructed so as to accommodate the fluctuation in the compressibility even with a buffer memory having a small capacity. For this purpose, in the present invention, the quantization characteristics for the sequences $\Delta S0$ and $\Delta S1$ are sequentially selected according to the output bit rates, so that the difference between the input bit rate and the output bit rate can be sufficiently accommodated by use of a buffer memory having a small capacity. That is, since the correlation between the adjacent lines of an image is generally strong and it is presumed that the fluctuation in the compressibility between the lines will be gradual, the quantization characteristic of the sequences $\Delta S0$ and $\Delta S1$ for the next block line is adaptively selected in accordance with the null condition of the buffer memory.

DESCRIPTION OF THE PREFERRED EMBODIMENTS

The present invention will hereinbelow be described in further detail with reference to the accompanying drawings.

Figure 3:
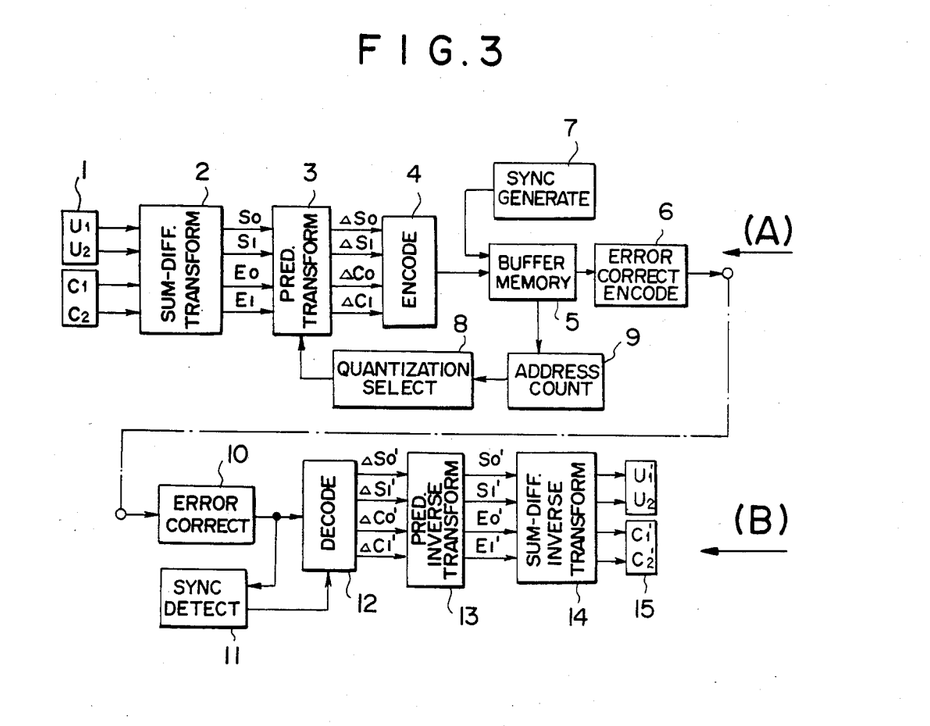
FIG. 3 is an explanatory block diagram showing an embodiment of the image compression system (A) in accordance with the present invention and the image reproducing system (B) employed therefor.

FIG. 3 shows an embodiment of the image compression system (A) in accordance with the present invention and the image reproducing system (B) employed therefor. The reference numeral 1 designates luminance picture elements $u_{j1}$ and $u_{j2}$ and color difference picture elements $c_{j1}$ and $c_{j2}$ which respectively correspond to the picture elements $u_1$ and $u_2$ of the block $B_{ij}$ as shown in FIG. 1. On the basis of the image information, a sum-difference transformation device 2 calculates sum components S0 and E0 and difference components S1 and E1 by $$S0 = (u_{j1} + u_{j2})/2, \; S1 = (u_{j1} - u_{j2})/2 \atop E0 = (c_{j1} + c_{j2})/2, \; E1 = (c_{j1} - c_{j2})/2 \quad (5)$$

A prediction transformation device 3 calculates prediction error components $\Delta S0$ and $\Delta S1$ by $$\Delta S0 = S_{0j} - S_{0,j-1}, \; \Delta S1 = S_{1j} - S_{1,j-1} \atop \Delta C0 = E_{0j} - E_{0,j-1}, \; \Delta C1 = E_{1j} - E_{1,j-1} \quad (6)$$

where $S_{0j}$ and $E_{0j}$ designate the sum components of the present block $B_{ij}$, $S_{1j}$ and $E_{1j}$ designate the difference components of the present block $B_{ij}$, $S_{0,j-1}$ and $E_{0,j-1}$ denote the sum components of the previous block $B_{i,j-1}$, $S_{1,j-1}$ and $E_{1,j-1}$ denote the difference components of the previous block $B_{i,j-1}$.

Figure 4:
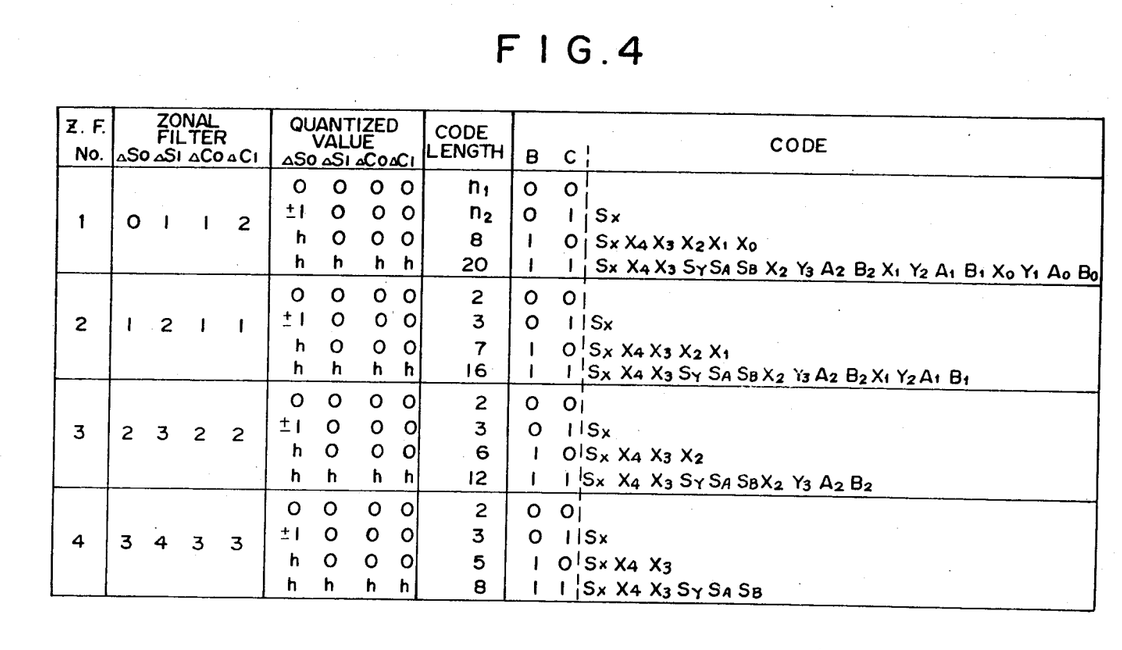
FIG. 4 is a table showing a plurality of quantization characteristics and variable-length codes imparted according to the combinations of quantized values.

The prediction error components $\Delta S0$ and $\Delta S1$ of the luminance signals and the prediction error components $\Delta C0$ and $\Delta C1$ of the color difference signals thus obtained are then quantized in the prediction transformation device 3 on the basis of the quantization characteristic selected by a quantization characteristics selector 8 for each block line. Thereafter, the prediction error components $\Delta S0$, $\Delta S1$, $\Delta C0$ and $\Delta C1$ adaptively quantized are encoded by an encoder 4 into a variable-length code. As shown in FIG. 4, the variable-length codes are determined according to the combinations of the quantized values of the prediction error components $\Delta S0$, $\Delta S1$, $\Delta C0$ and $\Delta C1$ for the respective quantization characteristics.

The variable-length code thus obtained by compression in the encoder 4 is sequentially entered into a buffer memory 5. In the case of real time processing, the output of the buffer memory 5 is simultaneously read out at a predetermined bit rate asynchronously with the input. A redundant signal for correcting an error arising in a transmission line is added by an error correction encoder 6 to the output signal of the buffer memory 5. The output signal thus provided with the redundant signal is then sent to the transmission line. When the read-out of one block line of the image is finished, a synchronizing signal is entered from a synchronizing signal generating circuit 7 to the buffer memory 5.

The quantization characteristics selector 8 holds P−1 address pointers obtained by dividing the address space of the buffer memory 5 into P sections. For example, when the buffer memory 5 has a capacity of 512 bytes, the quantization characteristics selector 8 has address pointers L1=P1, L2=128, L3=192, ..., L7=448 obtained by dividing the address space of the buffer memory 5 into eight sections. Each time the variable-length code is entered in a unit of, for example, eight bits (one byte) into the buffer memory 5, an address counter 9 counts +1. Also, the address counter 9 counts −1 each time the variable-length code is sent in a unit of eight bits at a predetermined output bit rate from the buffer memory 5. In this manner, the address counter 9 detects the null status of the buffer memory 5 when the processing of the input image signal of one block line is finished, and sends a signal indicating the null status to the quantization characteristics selector 8. Upon receiving this signal, the quantization characteristics selector 8 discriminates which address pointer Ln the null status of the buffer memory 5 belongs to. The quantization characteristics selector 8 also selects the quantization characteristic for the next block line and sends it to the quantizer in the prediction transformation device 3.

In the aforesaid embodiment, in order to prevent underflow from arising in the buffer memory 5, P1 is set to (output bit rate)×(total number of picture elements on one block line). However, P1 may be set to any other value.

In the embodiment as described above, even when the encoding bit rate to the buffer memory 5 fluctuates largely, it is possible to smooth the fluctuation with a small-capacity buffer memory and to output the variable-length code at a consistent transmission rate. That is, the quantization characteristics are selected so as to make the quantization of the prediction error components ΔS0, ΔS1, ΔC0 and ΔC1 for the next block line finer when the null area of the buffer memory 5 increases and underflow is likely to arise. Also, when the null area of the buffer memory 5 decreases and overflow is likely to arise, selection of the quantization characteristics is conducted so as to make the quantization for the next block line coarse.

Though coarse quantization has the tendency of adversely affecting the signal-to-noise ratio, an encoding bit rate higher than the output bit rate means that the image configuration of the block line is complicated. Accordingly, even when the quantization is made coarse, the deterioration is not so perceptible visually. However, the output bit rate is a guide to the design of the image quality of a reproduced image. When the encoding bit rate is higher than the output bit rate predetermined as the target of the image quality, control is effected so as to decrease the encoding bit rate. As a result, the image quality naturally deteriorates as compared with the target image quality. However, the deterioration in the image quality arises in the visually imperceptible direction.

On the other hand, by an encoding bit rate lower than the output bit rate is meant that the image configuration of the block line is smooth. In this case, the quantization is made fine since deterioration in the image quality becomes visually perceptible and there is the risk of underflow arising in the buffer memory 5.

As described above, the quantization characteristics are adaptively changed by utilizing the visual characteristics according to the output bit rate, i.e. the mean output bit length per input picture element, predetermined as the target of the image quality of the reproduced image. In this manner, it becomes possible to smooth the fluctuation in the encoding bit rate and to transmit the information at a predetermined output bit rate by use of a small-capacity buffer memory.

The variable-length code read out from the buffer memory 5 is transmitted at a predetermined output bit rate. In general, in order to improve the reliability of information transmission on a transmission line having low reliability, it is necessary to provide the information with redundancy. Particularly, band-compressed information has little redundancy and is readily affected by an error on the transmission line. Therefore, even when the image information is compressed to a high extent, it is necessary to add a redundant signal suitable for the error characteristics on the transmission line to the compressed information, thereby improving the reliability of the transmission line. As the code theory for such error correction technique, many methods have heretofore been known. In the case of the transmission line for magnetic recording, both random error and burst error increase as the recording density is increased. Therefore, it is necessary to employ an error correction encoding system suitable for eliminating such a problem.

In general, when the length of the error burst increases, it becomes difficult to correct the error burst. Therefore, it is necessary to rearrange the signals so that the length of the burst is short or the burst error becomes the random error. For this purpose, an interleaving method is known. As the error correction technique of this type, many methods have been established. For example, in a chain-like code method, a random error and a short error burst are corrected by an internal code, and a long error burst which cannot be corrected by the internal code and other errors are corrected by an external code. As the internal code and the external code for correcting or detecting the errors, codes such as a cyclic code, a Fire code and a Reed Solomon code are usually used. Any of the known methods may be employed insofar as an error is corrected efficiently according to the error characteristics of the transmission line so that the visual deterioration in the image quality due to the error is within the permissible range.

The image signals compressed as described above are sent to the image reproducing apparatus (B) of FIG. 3. In many cases, errors arising in the image signals during transmission on the transmission line are corrected by an error correcting circuit 10. A synchronizing signal detector 11 detects the synchronizing signals among the image signals sent at a predetermined bit rate. The signal sandwiched between the synchronizing signals is regarded as the compressed image signal and sent to a decoder 12. In the decoder 12, the variable-length code obtained by the compression and encoding in the encoder 4 is decoded so as to obtain the quantized values of the prediction error components ΔS0 and ΔS1 having fixed lengths according to the quantization characteristics as shown in FIG. 4. A prediction inverse transformation device 13 conducts inverse transformation to obtain sum components S0' and E0' and difference components S1' and E1', for example, by use of the relationships of $S_{0j}=\Delta S0+S_{0,j-1}$, and $S_{1j}=\Delta S1+S_{1,j-1}$. The sum components S0' and E0' and the difference components S1' and E1' contain quantization errors and transmission errors and are different from the sum components S0 and E0 and the difference components S1 and E1 obtained by the sum-difference transformation device 2.

The sum components S0' and E0' and the difference components S1' and E1' thus obtained are then sent to a sum-difference inverse transformation device 14, in which reproduced picture elements $u_{j1'}$, $u_{j2'}$, $c_{j1'}$, and $c_{j2'}$ of the block $B_{ij}$ are obtained by $$\left.\begin{array}{l} u_{j1'} = S0' + S1', u_{j2'} = S0' - S1' \\ c_{j1'} = E0' + E1', c_{j2'} = E0' - E1' \end{array}\right\} \quad (7)$$

The energy of the noise involved in one frame of the reproduced image obtained as described above can be expressed by $$10\log_{10}\{\Sigma\Sigma(u_{kj}-u_{kj'})^2/N\}dB \quad (8)$$

The energy of the noise expressed by the Equation (8) serves as a guide to the deterioration in image quality arising from the quantization and errors on the transmission line.

FIG. 4 shows the quantization characteristics selected according to the null status of the buffer memory 5 and the configurations of the variable-length codes. In FIG. 4, Z.F. NO. designates the zonal filtering number, i.e. the quantization characteristics number selected adaptively, and ZONAL FILTER denotes the zonal filter characteristics, i.e. the amounts of distortions imparted to the prediction error components ΔS0, ΔS1, ΔC0 and ΔC1. For example, in the case of the characteristic "1, 2, 1, 1" of Z.F. No. 2, quantization is effected so as to insert zero as the distortion amount to the low order bits 1, 2, 1 and 1 respectively of the values of the prediction error components ΔS0, ΔS1, ΔC0 and ΔC1. In this example, the linear quantization is carried out. Variable-length codes are allocated to the respective combinations of the quantized values of the prediction error components ΔS0, ΔS1, ΔC0 and ΔC1 thus obtained, i.e. the combinations of "0, 0, 0, 0", "±1, 0, 0, 0", "h, 0, 0, 0", and "h, h, h, h", wherein h designates a value other than 0 and ±1 for ΔS0, and a value other than 0 for ΔS1, ΔC0 and ΔC1. CODE LENGTH indicates the code length obtained by the variable-length encoding according to the quantization characteristics and the combination of the quantized values. When underflow is likely to arise in the buffer memory 5, the quantization characteristics number Z.F. No. 1 is used. In order to avoid the underflow, the code lengths n1 and n2 are set so as to coincide with the output bit rate. However, the code lengths n1 and n2 need not necessarily be set in such a manner. CODE designates the format for transmitting the quantized prediction error components ΔS0, ΔS1, ΔC0 and ΔC1. In the format, X, Y, A and B respectively designate the prediction error components ΔS0, ΔS1, ΔC0 and ΔC1. The numerals affixed to X, Y, A and B denote the bit positions of the values thereof. $S_X$, $S_Y$, $S_A$, and $S_B$ designate the plus and minus signs of the respective values. BC designates the block code indicating the combination of the quantized value. (At the step of decoding, the block code is used to identify the variable-length code used.)

Figure 5:
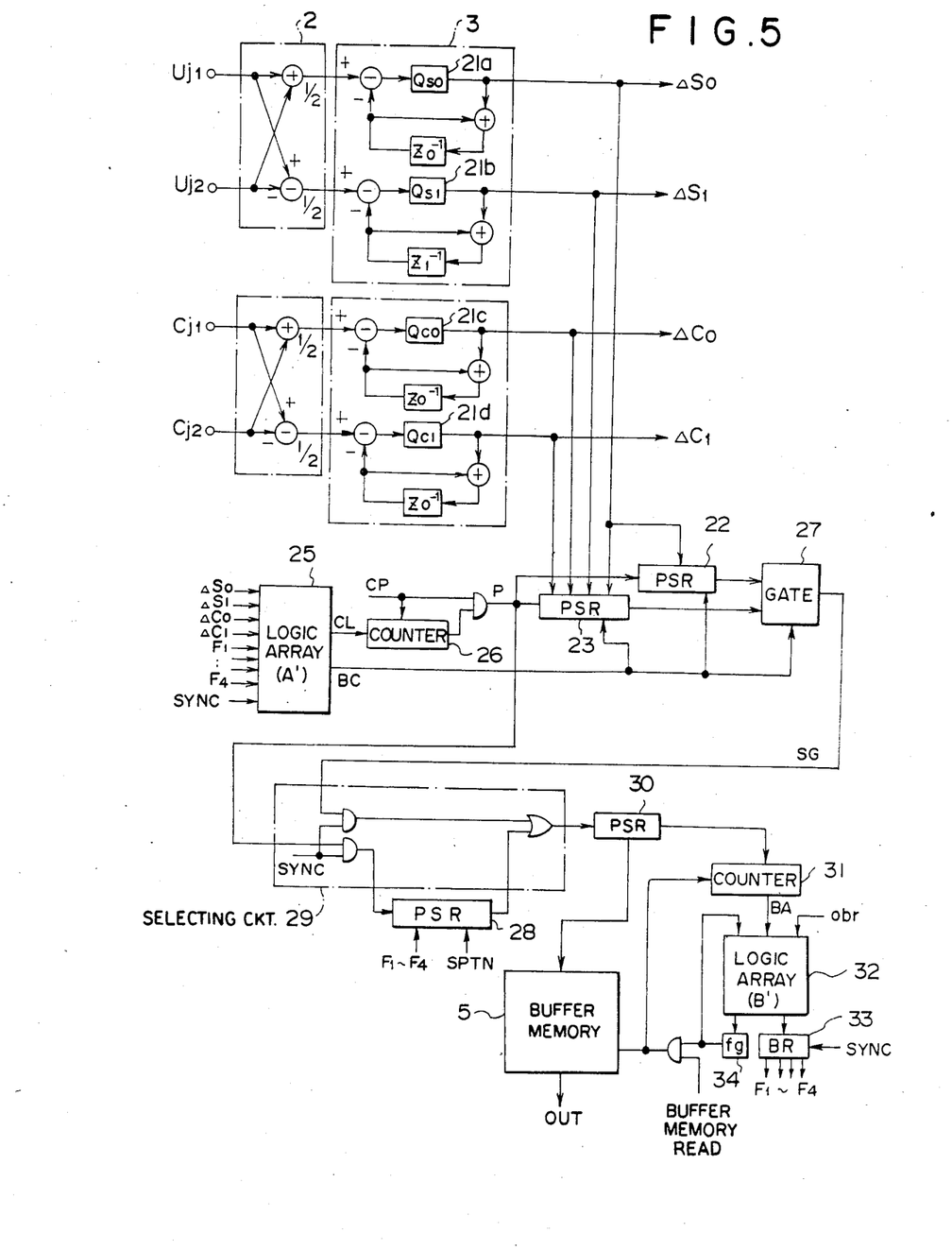
FIG. 5 is a diagram showing the circuit configuration of the image compression system (A) of FIG. 3, FIGS. 6A and 6B are circuit diagrams showing embodiments of the quantizer employed in the image compression.

FIG. 5 shows the circuit configuration of the image compression system (A) of FIG. 3. The picture elements $u_{j1}$, $u_{j2}$, $c_{j1}$, and $c_{j2}$ extracted from the window space 1×2 of the original image as shown in FIG. 1 are calculated as represented by the Equation (5) by the sum-difference transformation device 2 constituted by adders and subtracters to obtain the sum components S0 and E0 and the difference components S1 and E1.

The results of the addition and subtraction are halved as expressed by the Equation (5). This can be achieved simply by shifting the results of the addition and subtraction by one bit to the low order side, and by transmitting the shifted values to the prediction transformation device 3 positioned at the next stage.

The prediction transformation device 3 is composed of a basic DPCM (differential pulse code modulation) system, and generates the prediction error components ΔS0, ΔS1, ΔC0 and ΔC1. For example, the difference between the sum component S0 of the present block $B_{ij}$ and the predicted value $\hat{S0}$ thereof is calculated as the prediction error component ΔS0. The predicted value $\hat{S0}$ is obtained by using the sum component $S0'_{j-1}$ reproduced in the previous block $B_{i,j-1}$. The prediction error components ΔS0, ΔS1, ΔC0 and ΔC1 thus obtained are respectively quantized by quantizers 21a, 21b, 21c and 21d.

For example, when the quantization characteristics number used for the present block line is Z.F. No. 2, the zonal filter characteristic is "1, 2, 1, 1" for the prediction error components ΔS0, ΔS1, ΔC0 and ΔC1 respectively as shown in FIG. 4. Therefore, quantization is conducted so that zero is inserted as the distortion amount to the low order bits 1, 2, 1 and 1 respectively of the prediction error component ΔS0, ΔS1, ΔC0 and ΔC1. $Z^{-1}$ designates the one-block delay element for holding the sum components $S_{0,j-1}$ and $E_{0,j-1}$ and the difference components $S_{1,j-1}$ and $E_{1,j-1}$ of the previous block $B_{i,j-1}$ in the Equation (6).

Also, as the initial value for each block line, 32 is inserted to $Z0^{-1}$ and 0 is inserted to $Z1^{-1}$.

Figure 7:
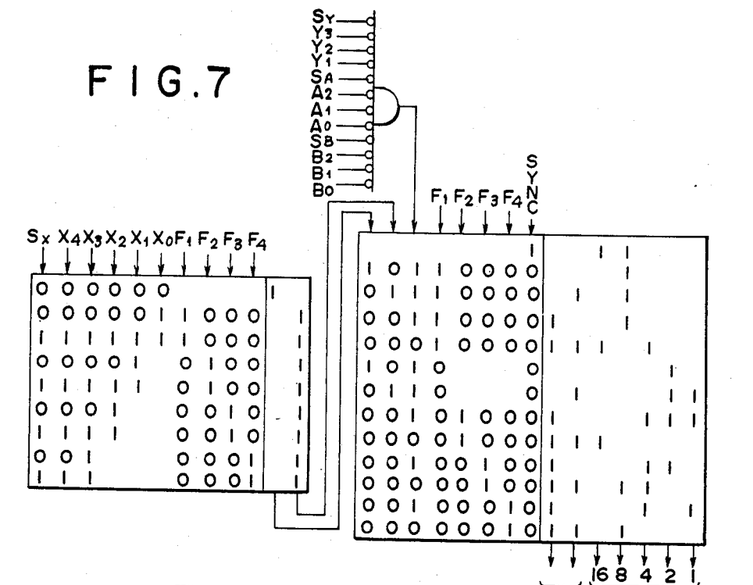
FIG. 7 is a diagram showing the logical structure of the logic array (A') employed in the circuit configuration of FIG. 5.

The prediction error components ΔS0, ΔS1, ΔC0, ΔC1 thus obtained are encoded into the variable-length codes as described below. That is, according to the code format of Z.F. No. 1 as shown in FIG. 4, the prediction error component ΔS0 is entered in the order of $S_X X_4 X_3 X_2 X_1 X_0$ into a shift register 22. Further, the prediction error components ΔS0, ΔS1, ΔC0 and ΔC1 are entered in the order of $S_X X_4 X_3 S_Y S_A S_B X_2 Y_3 A_2 B_2 X_1 Y_2 A_1 B_1 X_0 Y_1 A_0 B_0$ into a shift register 23. These entering operations are conducted in parallel to one another. At the same time, the prediction error components ΔS0, ΔS1, ΔC0 and ΔC1, filter signals F1 to F4 used for the present block line, and synchronizing signal SYNC are entered to a logic array 25. The logic array 25 generates the block code BC and the code length CL as shown in FIG. 4 according to the logical structure as shown in FIG. 7.

The block code BC is sent to the shift registers 22 and 23 and a signal selecting circuit 27, and the code length CL is sent to a counter 26. The filter signals F1 to F4 are the flags for the quantization characteristics numbers. F1=1 indicates Z.F. No. 1, F2=1 indicates Z.F. No. 2, F3=1 designates Z.F. No. 3, and F4=1 designates Z.F. No. 4.

Thus the filter signals F1 to F4 define the quantization characteristics for the next block line, which are selected according to the null status of the buffer memory 5 at the end of the encoding for the present block line. The operations of the filter signals F1 to F4 will later be described in further detail.

When the code length CL is entered to the counter 26, the output signal P of the counter 26 is set to a logic "1" level, and the counter 26 starts downward counting on the basis of the clock pulse CP. When the count of the counter 26 becomes zero, the signal P is reset. Accordingly, only when the signal P is at the logic "1" level, the shift registers 22 and 23 and a shift register 28 are driven by the clock pulse CP to carry out the bit-by-bit shift operations. When encoding for one block line is started, a synchronizing pattern SPTN (24 bits in this example) and the filter signals F1 to F4 for the block line are entered in parallel into the shift register 28. When the synchronizing signal SYNC for one block line is at a logic "1" level, the shift operations are carried out on the basis of the clock pulse CP until the code length CL for synchronization pattern entered in the counter 26 becomes zero. When the count of the counter 26 becomes zero, the synchronizing signal SYNC is reset to a logic "0" level. The shift registers 22, 23 and 28 are of the parallel-in/serial-out type.

The output signals obtained by the shift operations of the shift registers 22, 23 and 28 are sent to a shift register 30. Specifically, only when the block code BC is "11" is the output signal SG of the shift register 23 sent to the shift register 30 via signal selecting circuits 27 and 29. When the block code BC is "00", "01" or "10", the output signal of the shift register 22 is entered to the shift register. Further, only when the synchronizing signal SYNC is at a logic "1" level is the output signal of the shift register 28 sent to the shift register. The shift register 30 is of the serial-in/parallel-out type.

As described above, the output signals obtained by the shift operations of the shift registers 22, 23 and 28 driven by the clock pulse CP are sequentially entered into the shift register 30. The signals sequentially entered into the shift register 30 are then transmitted in a unit of eight bits to the buffer memory 5. Each time the signal is transmitted to the buffer memory 5, a counter 31 conducts upward counting.

Asynchronously with the input of the codes in a unit of e.g. eight bits from the shift register 30 into the buffer memory 5, codes are outputted in a unit of e.g. eight bits from the buffer memory 5. Each time the code is outputted, the counter 31 carries out downward counting.

The buffer memory 5 is timed so that the codes are outputted therefrom when a flag circuit 34 as described later is at a logic "1" level and the buffer memory 5 receives a read-out signal BM READ generated according to the predetermined output bit rate.

Figure 9:
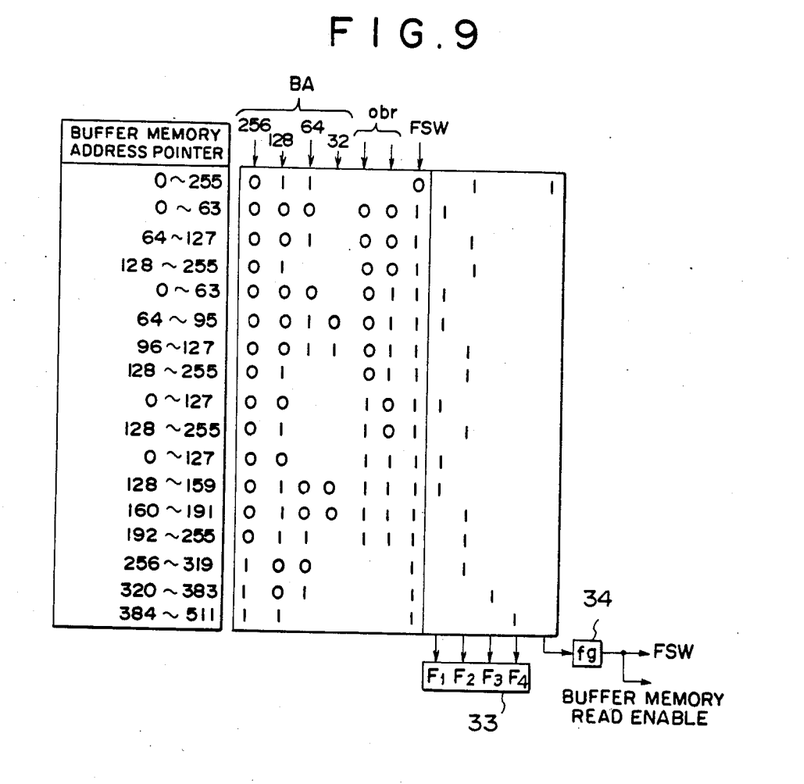
FIG. 9 is a diagram showing the logical structure of the logic array (B') employed in the circuit configuration of FIG. 5.

A logic array 32 discriminates the range of the address pointer $L_1, \ldots L_p$ as counted by the counter 31, within which the null status of the buffer memory 5 is included, and selects one of the quantization characteristics (filter signals F1 to F4) for the next block line. The logic array 32 outputs the filter signals F1 to F4 on the basis of the logical structure as shown in FIG. 9. That is, address pointers BA of the buffer memory 5 are sequentially entered from the counter 31 to the logic array 32. Further, an output signal FSW of a flag circuit 34 and a code obr designating the output bit rate from the buffer memory 5 are always entered to the logic array 32. The flag circuit 34 is composed of a flip-flop circuit and the initial value thereof is 0. As shown in FIG. 9, when a predetermined address pointer $L_s$ is set, the flag circuit 34 goes to a logic "1" level only when the requirement of address pointer $L1=L_s$ is satisfied, i.e. when the address pointer BA reaches 256 for the first time in this example. Thereafter, the output at the predetermined bit rate from the buffer memory 5 becomes possible.

Normally, the logic array 32 generates an output signal so that one of the filter signals F1 to F4 selected according to the indication of the address pointer BA and the predetermined output bit rate obr goes to a logic "1" level.

The filter signal F1, F2, F3 or F4 thus selected is stored in a buffer register 33. This storage is conducted only when the buffer register 33 receives the synchronizing signal SYNC. Namely, the filter signal F1, F2, F3 or F4 selected for the next block line according to the address pointer BA sent from the counter 31 at the end of the present block line is stored in the buffer register 33.

Of course, it is also possible to activate the logic array 32 only at the end of one block line.

As described above, the quantized values of the prediction error components $\Delta S0, \Delta S1, \Delta C0$ and $\Delta C1$ obtained by the sum-difference transformation and the prediction transformation are encoded into variable-length codes according to the combinations of the quantized values, and stored in the buffer memory 5 having a small capacity. Asynchronously with the input bit rate (encoding bit rate), the variable-length codes are read out of the buffer memory 5 at the predetermined output bit rate and sent to the error correction encoder 6 as shown in FIG. 3.

Figure 10:
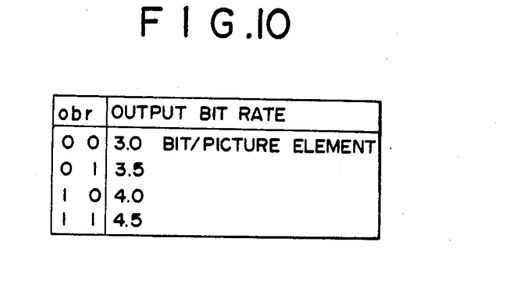
FIG. 10 is a table showing examples of codes specifying the output bit rates of the buffer memory.

As shown in FIG. 10, the output bit rate from the buffer memory 5 can be adjusted as desired according to the transmission line. A desired output bit rate can be obtained only by feeding the code obr indicating the adjusted output bit rate to the logic array 32. Namely, the image compressibility can be selected as desired according to the image quality design.

The quantizers for the prediction error components employed in the circuit configuration of the image compression system of FIG. 5 will hereinbelow be described in further detail with reference to FIGS. 6A and 6B.

Figure 6A:
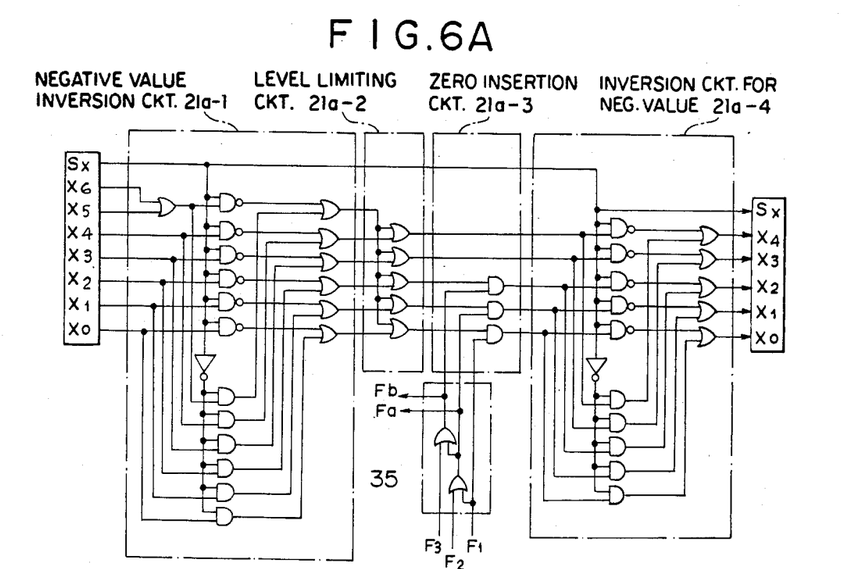
Figure 6B:
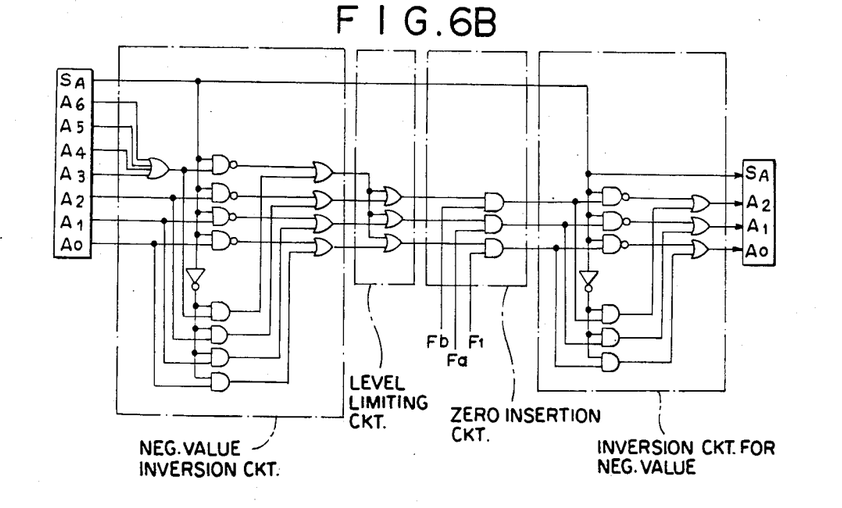

FIG. 6A shows an embodiment of the quantizer 21a for the prediction error component $\Delta S0$ as shown in FIG. 5. A circuit 21a-1 inverts the value of the prediction error component $\Delta S0$ when the value is negative. (This method is employed for simplicity though the absolute value of the prediction error component $\Delta S0$ should regularly be calculated.) A level limiting circuit 21a-2 operates in such a manner that, when the number of bits allocated to the prediction error component $\Delta S0$ is six, the level is limited to a value within the range of $-32$ to $+31$. In this case, the level of $\Delta S0 = -38$ is limited to $\Delta S0 = -32$, and the level of $\Delta S0 = 36$ is limited to $\Delta S0 = 31$.

A circuit 21a-3 inserts zero to the low order bit of the prediction error component $\Delta S0$ for the purpose of quantization according to the quantization characteristics. The buffer register 33 as shown in FIG. 5 adaptively controls the bit position, at which zero is inserted, by the filter signals F1, F2 and F3. For example, when the filter signal F2 is at a logic "1" level, zero is inserted only to the least significant bit of the prediction error component $\Delta S0$. A circuit 21a-4 returns the value inverted from the negative value by the circuit 21a-1 to the original value.

In general, the quantizer in the DPCM system conducts nonlinear quantization so as to minimize visual deterioration in image quality by utilizing the form of the prediction error components approximately exhibiting the Laplace distribution. However, for a complicated image, the variance of the prediction error components becomes large, and deterioration in the image quality becomes rather perceptible when the nonlinear quantization conducted in the same manner as for a smooth image is employed. The nonlinear quantization as described above can be easily realized by using a look-up table. On the other hand, the linear quantization can be realized more easily by equally discarding the low order bits of the prediction error components. When the compressibility is the same, no significant difference in the image quality is observed between the linear quantization and the nonlinear quantization. Therefore, the embodiment of the present invention is described herein with respect to the linear quantization.

Figure 8:
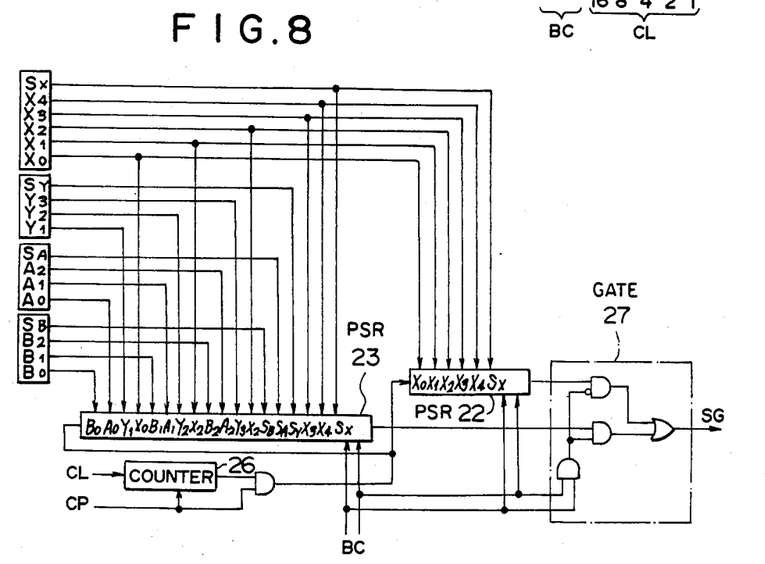
FIG. 8 is a diagram showing the bit arrangement of transmission information in FIG. 5.

The quantizers 21b, 21c and 21d of FIG. 5 can be realized in the same manner as described above. Therefore, an embodiment of only the quantizer 21c for the prediction error component $\Delta C0$ is shown in FIG. 6B. FIG. 8 shows the bit arrangement of the quantized prediction error components $\Delta S0, \Delta S1, \Delta C0$ and $\Delta C1$ and the block code BC transmitted in parallel to the shift registers 22 and 23 in FIG. 5. The bit arrangement is employed to facilitate decoding in the image reproducing system as described below.

The embodiment of the present invention is described above with respect to the case where the input to the buffer memory 5 and the output therefrom are carried out in the real time mode. In this case, it is necessary for the buffer memory 5 to have a capacity sufficient to accommodate the fluctuation in the compressibility. In this connection, it has been found that it is sufficient for the buffer memory 5 to have a capacity of bytes in a number equal to the number of the picture elements of two block lines of the original image when the mean output bit rate is within the range of 3.0 bits/picture element to 6.0 bits/picture element. In the embodiment as described above, the buffer memory 5 has a capacity of 512 bytes. Also when the variable-length codes for one frame of the image are entered to the buffer memory 5 and thereafter transmitted at a predetermined bit rate from the buffer memory 5 to the transmission line, the image compression system can be realized in the same manner as described above. In this case, the buffer memory 5 having the capacity necessary for one frame with reference to the output bit rate of the buffer memory 5. For example, when the output bit rate is 3.5 bits/picture element on the average, the buffer memory 5 having a capacity of 3.5×(number of picture elements of one frame) bits is installed. By assuming that the codes are outputted from the buffer memory 5 at the aforesaid output rate for the respective block line, the quantization characteristic for the next block line is selected.

The variable-length codes obtained by encoding the prediction error components $\Delta S0$, $\Delta S1$, $\Delta C0$ and $\Delta C1$ by the image compression system as described above are sent to the image reproducing system through the transmission line.

Figure 11A:
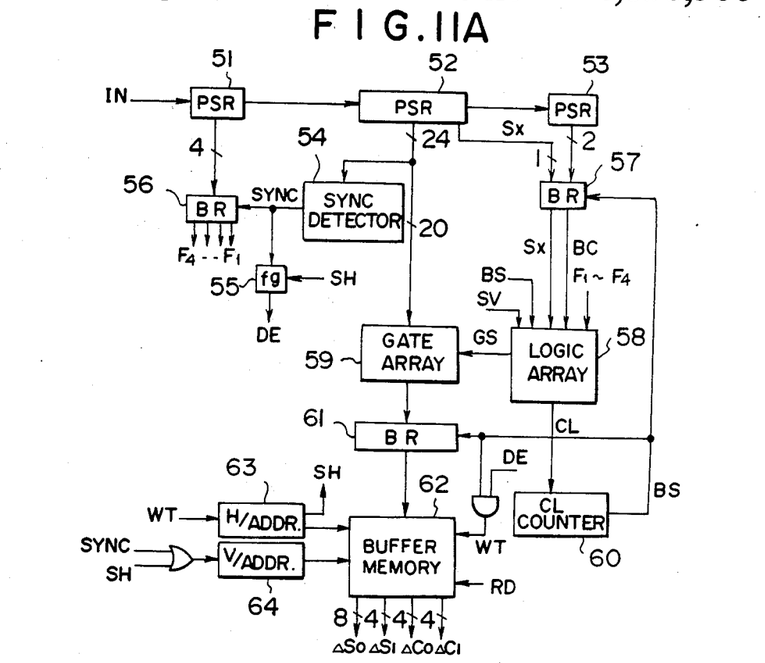
FIG. 11A is an example of circuit configurations for inverse transformation of the variable-length codes shown in FIG. 4 into quantized values of the prediction error components ($\Delta S_0$, $\Delta S_1$, $\Delta C_0$, and $\Delta C_1$)

FIG. 11A shows the circuit configuration of the image reproducing system (B) of FIG. 3. The variable-length code obtained by the image compression is sent bit by bit to a shift register 51 through the transmission line, e.g. in a magnetic recording system. The output signal of the shift register 51 is sent to a shift register 52, the output signal of which is then sent to a shift register 53.

The shift registers 51, 52 and 53 are of the serial-in/parallel-out type. A flag circuit 55 composed of a flip-flop element is initially in the reset condition. A synchronizing signal detecting circuit 54 detects a synchronizing signal from the signals sent in parallel from the shift register 52 each time an input signal IN is entered bit by bit into the shift register 51. Detection of the synchronizing signal can be conducted, for example, by regarding 24-bit data of the shift register 52 as the synchronizing signal when the 24-bit data coincides with a predetermined synchronizing signal pattern.

However, since the input signals IN are sequentially entered into the shift register 52, the system must be designed so that the synchronizing signal detection pattern can be securely discriminated from the image signals, or so that there is an extremely small probability of an image signal accidentally becoming identical with the synchronizing signal pattern due to an error on the transmission line or the like. A signal SYNC generated by the detection of the synchronizing signal puts the flag circuit 55 to the set condition, and at the same time the 4-bit data of the shift register 51 is maintained in a buffer register 56. The 4-bit data maintained in the buffer register 56 corresponds to one of the aforesaid filter signals F1 to F4, and determines the quantization characteristic for the image signals inputted next. When the flag circuit 55 is in the set condition, the 24-bit data of the shift register 52 is recognized as an image signal and decoded. However, when the synchronizing signal is just detected, the synchronizing signal pattern still remains in the shift register 52. Therefore, at this point of time, the signal SYNC is entered into a logic array 58 as described later. From the logic array 58, a signal CL (value 28 in this example) is taken out and entered into a counter 60, which starts downward counting in synchronization with the input signal IN. When the count of the counter 60 reaches zero, the block code BC as shown in FIG. 4 is stored in the shift register 53.

When the block code BC is sent to the shift register 53, the count of the counter 60 is zero. Accordingly, by an output signal BS generated by the counter 60 at this time, the block code BC (two bits) in the shift register 53 and data Sx (one bit) at the most significant position of the shift register 52 are maintained in a buffer register 57. When the block code BC in the shift register 53 is "00", the data Sx at the most significant position of the shift register 52 defines the head bit of the next block code. When the block code BC is other than "00", the data Sx designates the plus or minus sign of the prediction error component $\Delta S0$ as shown in FIG. 4.

Figure 12:
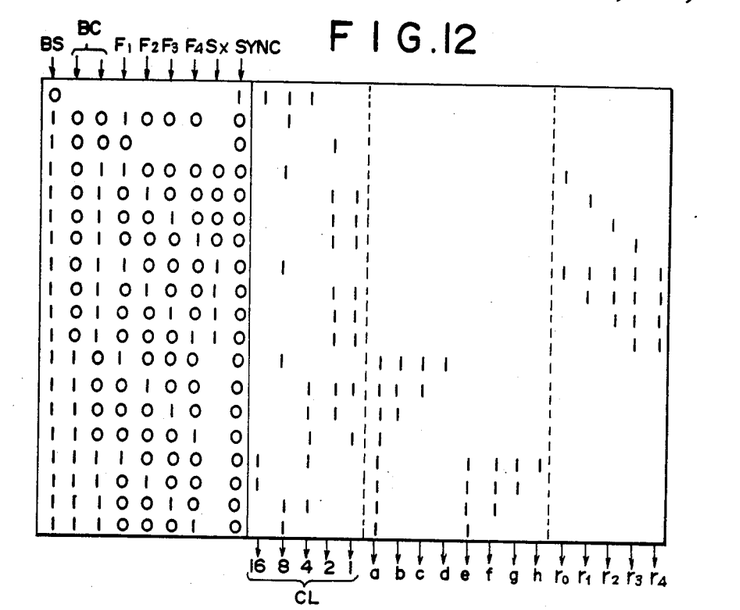
FIG. 12 is a diagram showing the logical structure of the logic array employed in the circuit configuration of FIG. 11.

The data in the buffer register 57 is immediately entered into the logic array 58, and a gate signal GS and a code length signal CL for the variable-length code are generated by the logic array 58. The logic array 58 outputs the gate signal GS and the code length signal CL according to the filter signals F1 to F4, the block code BC, the signal Sx following the block code BC, and the condition of the block signal BS when the counter 60 counts zero. The logical structure of the logic array 58 is shown in FIG. 12.

When the gate signal GS is outputted from the logic array 58, the data code as shown in FIG. 4 is stored in the shift register 53. Therefore, the data stored in the shift register 52 is passed through a gate array 59 on the basis of the gate signal GS, entered into a buffer register 61 and maintained therein by a predetermined delay signal of the block signal BS.

Figure 13:
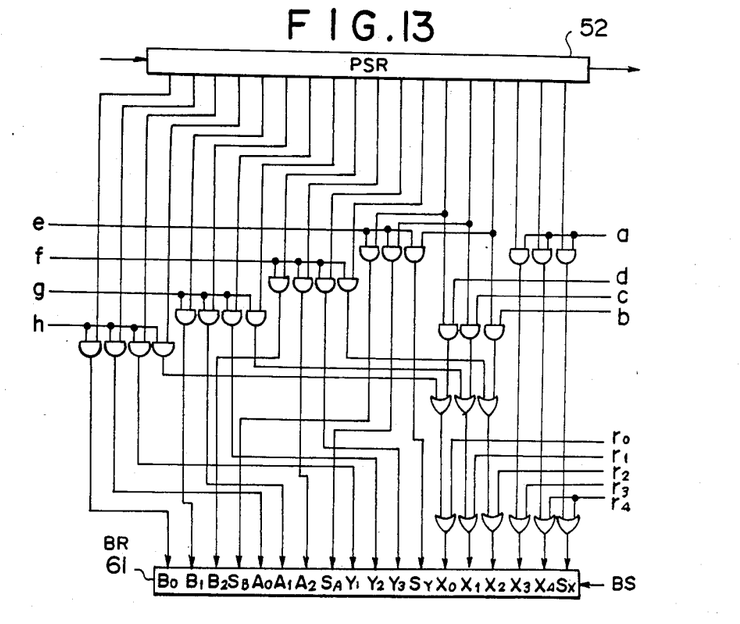
FIG. 13 is a circuit diagram showing an embodiment of the gate array employed in the circuit configuration of FIG. 11.

The gate array 59 comprises AND gates and OR gates as shown in FIG. 13.

When the block code BC is "00", all gate signals GS (a to h, and r0 to r4) as shown in FIG. 13 are at a logic "0" level, and therefore a value 0 is maintained in the buffer register 61. When the block code BC is "01", "+1" or "−1" of the prediction error component $\Delta S0$ is maintained depending on the conditions of r0 to r4 among the gate signals GS. In this manner, depending on the gate signals GS (a to h, and r0 to r4), the prediction error components $\Delta S0$, $\Delta S1$, $\Delta C0$ and $\Delta C1$ are maintained in the buffer register 61 in the format of the buffer register 61 as shown in FIG. 13.

The data in the buffer register 61 is stored at a predetermined address of a buffer memory 62 by a write signal WT, which is outputted after a predetermined delay time of the block signal BS when an output signal DE of the flag circuit 55 is in the set condition.

An address signal for entering the data into the buffer memory 62 is generated by a horizontal address counter 63 (block counter) and a vertical address counter 64 (block line counter).

On the other hand, when the code length signal CL outputted from the logic array 58 is entered into the counter 60 as described above, the counter starts downward counting in synchronization with the input signal IN. When the counter 60 counts zero, it generates the block signal BS. At this time, the next block code is stored in the shift register 53.

The aforesaid operations are repeated, and the prediction error components $\Delta S0$, $\Delta S1$, $\Delta C0$ and $\Delta C1$ of each block are decoded and sequentially entered into the buffer memory 62. Operations will further be described from the point of time when the synchronizing signal is detected in the case where signals transmitted from the image compression system (A) of FIG. 3 are inputted bit by bit in the order of ". . . 'SYNC'0100'011'00'1101011010111101'1011001'. . . ". When the synchronizing signal is detected, the filter signal "0100" stored in the shift register 51 is maintained in the buffer register 56 by the signal SYNC. By this is meant that the filter signal F2=1 (Z.F. No. 2 in FIG. 4) is used for the block line. On the other hand, a value 28 is outputted as the code length signal from the logic array 58 on the basis of the signal SYNC. When the counter 60 counts downward and counts zero, the block code "01" is stored in the shift register 53. Accordingly, by the inputs of BC="01", Sx="1", and F2="1", the logic array 58 generates the gate signals GS (r1 to r4 are at a logic "1" level) and the code length signal CL=3. At this time, "111110, 0000, 0000, 0000" is inputted from the shift register 52 to the buffer register 61 via the gate array 59 having the circuit configuration as shown in FIG. 13. Namely, the prediction error components $\Delta S0=-2$, $\Delta S1=\Delta C0=\Delta C1=0$ are reproduced. On the other hand, when the code length signal CL=3 is entered to the counter 60 and the counter 60 counts downward to zero and outputs the block signal BS, the next block code "00" is stored in the shift register 53. Since BC="00", BS="1" and F2="1", the logic array 58 generates the gate signals GS (all at a logic "0" level) and the code length signal CL=2. At this time, the data in the shift register 52 is not passed through the gate array 59. Therefore, all contents in the buffer memory 61 are "0", and $\Delta S0=\Delta S1=\Delta C0=\Delta C1=0$ is reproduced. Then, when the data in the shift registers 51, 52 and 53 is of two-bit shift (CL=2), the next block code "11" is stored in the transformation 53. At this time, since BC="11", BS="1", and F2="1", the gate signals GS (a, e, f, and g are at a logic "1" level) and the code length signal CL=10 are obtained. Also, since the gate signals a=e=f=g="1", "010110, 1010, 1100, 0110" is inputted from the shift register 52 to the buffer register 61. Thus $\Delta S0=22$, $\Delta S1=-6$, $\Delta C0=-4$, and $\Delta C1=6$ are reproduced. Further, when the data in the shift registers 51, 52 and 53 is of a 10-bit shift (CL=10), the next block code "10" is stored in the shift register 53. Since BC="10", BS="1", and F2="1", the gate signals GS (a, b, and c are at a logic "1" level) and the code length signal CL=8 are obtained. Thus "110010, 0000, 0000, 0000" is inputted from the shift register 52 to the buffer register 61, and $\Delta S0=-14$, $\Delta S1=\Delta C0=\Delta C1=0$ are reproduced.

The aforesaid operations are repeated in synchronization with the input signal, and the reproduced prediction error components $\Delta S0$, $\Delta S1$, $\Delta C0$ and $\Delta C1$ for each block are stored in the buffer memory 62. At this time, the input addresses to the buffer memory 62 are controlled by the horizontal address counter 63 (block counter) and the vertical address counter 64 (block line counter). The horizontal address counter 63 counts block by block on the basis of the write signal WT of the buffer memory 62, and generates the signal SH upon counting the number of blocks corresponding to one block line. In the case where the configuration of the variable-length code representing the image signal is disturbed due to an error arising on the transmission line, the signal SH indicating the end of one block line is generated before the synchronization signal SYNC is detected. In this case, the flag circuit 55 is reset to ignore the input of the image signal of the remaining blocks that should exist intrinsically for the block line, and the system waits for the detection of the next synchronizing signal.

Though not shown, it is advantageous to construct the system so as to reset the flag circuit 55 by the synchronizing signal SYNC also when the configuration of the variable-length code is disturbed as described above and the next synchronizing signal is detected prior to the counting of blocks in the number corresponding to one block line. In this case, the buffer memory 62 lacks the image signals of the remaining blocks of the block line. In any case, when the image signal is disturbed as described above, it is necessary to take a step, for example, to replace the prediction error components $\Delta S0$, $\Delta S1$, $\Delta C0$, and $\Delta C1$ of each block for the present block line in the buffer memory 62 by the corresponding prediction error components of the previous block line. The vertical address counter 64 (block line counter) adds the block line on the basis of the signal SYNC or SH.

As described above, the decoded prediction error components $\Delta S0$, $\Delta S1$, $\Delta C0$, and $\Delta C1$ of each block are sequentially entered into the buffer memory 62. Asynchronously with these inputs, the prediction error components $\Delta S0$, $\Delta S1$, $\Delta C0$, and $\Delta C1$ of each block are sequentially read out of the buffer memory 62 on the basis of the read signal RD. Besides the write address counters 63 and 64, read address counters (not shown) are also necessary.

Figure 11B:
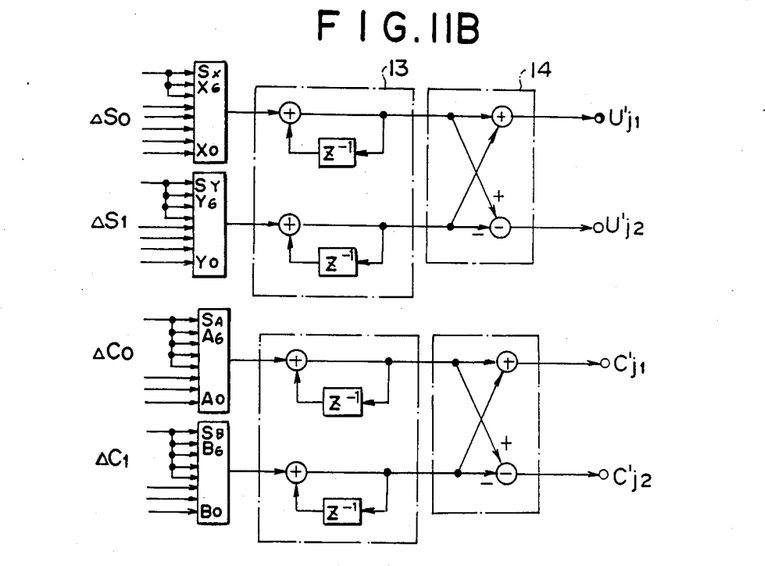
FIG. 11B is an example of circuit configurations for conducting prediciton inverse transformation of the above quantized values according to Equation (6) and further conducting sum-difference inverse transformation thereof according to Equation (7).

Thereafter, the prediction error components $\Delta S0$, $\Delta S1$, $\Delta C0$, and $\Delta C1$ read out of the buffer memory 62 are calculated for inverse transformation as expressed by the Equation (6) in the prediction inverse transformation device 13, thereby obtaining the sum components S0' and E0' and the difference components S1' and E1'. This is shown in FIG. 11B. Further, by the sum-difference transformation device 14, the reproduced picture elements $u_{ji}'$, $u_{j2}'$, $c_{j1}'$, and $c_{j2}'$ are obtained as represented by the Equation (7).

The logic arrays 25, 32 and 58 having the logical structures as shown in FIGS. 7, 9 and 12 are composed of the AND gate array positioned on the input side and the OR gate array positioned on the output side according to the formats. Therefore, the logic arrays 25, 32 and 58 can be realized easily by use of, e.g., PLAs (programmable logic arrays).

The embodiment of the present invention is described above for the case of the compression and reproducing of a color image. For example, the picture elements may be arranged like luminance signals (Y1, Y2) and color difference signals (C1, C2) according to the picture elements $B_{ij}(u1, u2)B_{ij}(c1, c2)$ as shown in FIG. 1.

I claim:

1. An adaptive type compression method for compressing a color image comprising the steps of:
   (i) forming a plurality of blocks of picture elements, said picture elements each being represented by a plurality of color image components separated from a color image signal, each said block of picture elements comprising two adjacent picture elements,
   (ii) obtaining sum components and difference components for each block using said color image components representing the two picture elements of each block,
   (iii) transforming said sum components and said difference components of each two adjacent blocks into predication error components for each block, (iv) quantizing said prediction error components on the basis of a quantization characteristic selected from a plurality of predetermined quantization characteristics, (v) obtaining a plurality of combinations of quantized values based upon the quantized prediction error components for each block, and (vi) imparting a predetermined variable-length code to each combination of quantized values.

2. An adaptive type compression method as defined in claim 1 further comprising the steps of:

providing a buffer memory having a predetermined capacity, entering into said buffer memory said variable-length code imparted to each combination of quantized values of said prediction error components for each block at an input bit rate and reading out therefrom said variable-length code at a predetermined output bit rate asynchronously with the input bit rate to said buffer memory, and, after the variable-length codes for a plurality of predetermined blocks have been entered into said buffer memory, selecting a quantization characteristic from said plurality of predetermined quantization characteristics to be used for the quantization of the prediction error components for a next plurality of predetermined blocks on the basis of the amount of said variable-length codes remaining in said buffer memory.

3. An adaptive type compression method as defined in claim 2 further comprising the steps of:

adding the code length of a variable-length code to an address counter when the variable-length code is entered into said buffer memory, and subtracting the code length of a variable-length code from the address counter when the variable-length code is read out from said buffer memory, dividing said buffer memory into a plurality of address spaces represented by address pointers L1, L2, ..., Lp, and, after the variable-length codes of said plurality of predetermined blocks have been entered into said buffer memory, selecting a quantization characteristic to be used for the quantization of the prediction error components for said next plurality of predetermined blocks by discriminating, based upon said address pointers L1, L2, ..., Lp, the amount of said address spaces occupied by said variable-length codes remaining in said buffer memory.

4. An adaptive type compression method as defined in claim 2 further comprising the steps of providing an address pointer Ls at a predetermined point in the address space of said buffer memory, and starting to read out said variable-length codes from said buffer memory when said variable-length codes entered into said buffer memory reach said address pointer Ls.

* * * * *